United States Patent [19]

Strassheimer

[11] Patent Number: 4,885,197

[45] Date of Patent: Dec. 5, 1989

[54] PLASTIC PREFORM FOR FORMING BLOW MOLDED PLASTIC BOTTLES

[75] Inventor: Herbert Strassheimer, Windermere, Fla.

[73] Assignee: Plasticon Patents, S.A., Geneva, Switzerland

[21] Appl. No.: 262,781

[22] Filed: Oct. 26, 1988

[51] Int. Cl.⁴ .................. B65D 1/02; B65D 23/00
[52] U.S. Cl. ..................... 428/36.92; 215/1 C;
220/70; 220/72; 220/83; 428/542.8
[58] Field of Search ............. 428/36.92, 542.8;
215/1 C; 220/70, 72, 83

[56] References Cited

U.S. PATENT DOCUMENTS 4,334,627  6/1982  Krishnakumar et al. ........... 215/1 C
4,403,706  9/1983  Mahajan ........................... 428/542.8
4,725,464  2/1988  Collette ........................... 428/36.92
4,785,948  11/1988  Strassheimer .................... 428/36.92

Primary Examiner—Ellis P. Robinson
Assistant Examiner—James J. Seidleck
Attorney, Agent, or Firm—Bachman & LaPointe

[57] ABSTRACT

A plastic preform for forming blow molded plastic containers wherein the inside wall face of the tubular body portion adjacent the bottom structure and extending onto the bottom structure has a plurality of flat faces with terminal portions thereof. Scallop-shaped segments are provided connecting the terminal portions of each flat face to initiate deformation prior to deformation of the flat faces and thereby have an increased rate and degree of orientation.

8 Claims, 2 Drawing Sheets

PLASTIC PREFORM FOR FORMING BLOW MOLDED PLASTIC BOTTLES

BACKGROUND OF THE INVENTION

This invention relates to thermoplastic containers for the retention of fluids under pressure, such as carbonated beverages and the like. These containers may be prepared from a preform or parison which may be injection molded, followed by blow molding said parison into a suitably shaped container. A typical thermoplastic material is poly (ethylene terephthalate) or PET, although others can be used.

The container configuration generally includes a neck portion with a cap-receiving means, a shoulder portion depending therefrom, a side wall or main body portion depending from the shoulder portion and a bottom wall joined to the side wall. In many of these containers the bottom wall has a champagne bottle bottom configuration with an internal, axially inwardly directed, generally conical part.

The bottom wall of these containers represents a weak part of the container. Also, it is desirable to provide a bottom shape capable of serving as a bottom support.

Thus, beverage under pressure within the container has a tendency to deform the bottom wall, as for example inverting the inwardly directed conical part to render the bottom wall unstable.

Many attempts have been made to overcome these problems while at the same time providing a construction which is inexpensive and economical to process. For example, U.S. Pat. No. 3,881,621 provides a ribbed strengthening at the bottom wall; however, this still provides insufficient strengthening. U.S. Pat. No. 4,134,510 provides a plurality of concentric annular strengthening ribs and a plurality of additional intersecting radial ribs in a complex and expensive procedure. U.S. Pat. Nos. 4,620,639, 4,261,948, 4,603,831, and 4,334,627 utilize a plurality of inwardly projecting rigid ribs so that the bottom wall is thicker at the ribbed portion than the remainder of the bottom wall; however, this results in a container having substantial and sharply defined differences in wall thickness with resultant sharp temperature differences in processing presenting difficult processing control problems.

Copending U.S. patent application Ser. No. 044,469, By Herbert Strassheimer, teaches an improved plastic preform for forming blow molded plastic containers and resultant improved plastic containers wherein the container has a tubular body portion adjacent a bottom portion and extending onto the bottom portion having circumferentially spaced radially extending continuous alterations in wall thickness. The preform is characterized by the bottom structure thereof having a plurality of flat faces capable of forming a blow molded plastic bottle with a bottom portion having said circumferentially spaced radially extending continuous alterations in wall thickness with a regularly undulating cross section across the circumference thereof, wherein said alterations in wall thickness are progressive and gradual. The teaching of said copending application Ser. No. 044,469 provides a stable and reinforced bottom wall configuration which is simple in construction and inexpensive to prepare and a preform which is similarly convenient and expeditious to prepare. However, it is desirable to further improve the characteristics of the resultant container, especially the resultant bottom regions corresponding to the corners between the flat faces of the preform. It is highly desirable to enhance the properties at this region and increase local orientation.

It is therefore a principal object of the present invention to provide an improved plastic preform and an improved thermoplastic container prepared therefrom having a stable and reinforced bottom wall configuration.

It is a further object of the present invention to provide an improved preform and container as aforesaid which is simple in construction and inexpensive to prepare.

Further objects and advantages of the present invention will appear hereinbelow.

SUMMARY OF THE INVENTION

In accordance with the present invention it has now been found that the foregoing objects and advantages may be readily obtained. The preform or parison of the present invention is for forming blow molded plastic containers and comprises a neck portion defining an opening, a tubular body portion depending therefrom, and an integral bottom structure depending from the tubular body portion, said preform having an outside wall face and an inside wall face, with the inside wall face of the tubular body portion adjacent the bottom structure and extending onto the bottom structure having a plurality of flat faces with terminal portions thereof, scallop-shaped segments connecting the terminal portions of each flat face adapted to deform upon exposure to stresses prior to deformation of the flat faces and thereby become subject to an increased rate and degree of orientation.

In a preferred embodiment the flat faces form a hexagonal configuration, although other configurations may readily be employed such as for example an octagonal configuration. In addition, in a preferred embodiment the wall thickness adjacent the bottom structure is less than the wall thickness of the tubular body portion.

The present invention also provides an improved blow molded plastic container prepared from the aforesaid plastic preform by stretch-blow molding.

The construction of the preform and resultant container provides significant advantages, especially in the larger bottle diameters. Naturally, the larger the bottle diameter particularly at the base, the higher the tensile strength and creep resistance is required of the material at the base. Considering for example the embodiment wherein the inside wall face forms a hexagonal configuration, the thick portions around the periphery of the preform which then form the thickened regions in the corresponding locations of the container, produce regions of sufficient strength due to their given degree of orientation, naturally supported by the thickened wall. However, the bottle regions corresponding to the corners between the flat faces of the hexagon may depending on the size of the bottle not have sufficient strength. In accordance with the present invention, the inventor herein provides scallop-shaped segments connecting the terminal portions of each flat face of the preform. These scallop-shaped segments initiate deformation in blowing, particularly circumferential stretch at the corner regions, before deformation is initiated at the thickened portions. Correspondingly, the said scallop-shaped segments have an increased rate and degree of orientation than the thickened portions. Also, the deformation of the scallop-shaped segments will tend to occur at a lower temperature because the heat retention in the thinner section is smaller to begin with and the drop in temperature during deformation accelerates in keeping with the corresponding degree of thinning of the cross section. The resultant container is provided with continuous alterations in wall thickness with a regularly undulating cross section across the entire circumference of the inside wall face which is progressive and gradual, wherein said continuous alterations in wall thickness are provided on the tubular body portion adjacent the bottom portion and extending onto the bottom portion. The thinner portions of the continuous alterations in wall thickness are extended in length due to the aforesaid provision of the scallops in the preform; however, it has been found that the overall strength of the bottom portion is increased especially at the thinner portions due to the increased rate and degree of orientation described hereinabove.

The foregoing features and advantages of the construction of the present invention and others will be discussed hereinbelow.

BRIEF DESCRIPTION OF THE DRAWINGS

The foregoing will be more readily apparent when considered in connection with the following illustrative examples wherein:

FIG. 2b is an alternate embodiment similar to FIG. 2a;

DETAILED DESCRIPTION

Figure 2B:
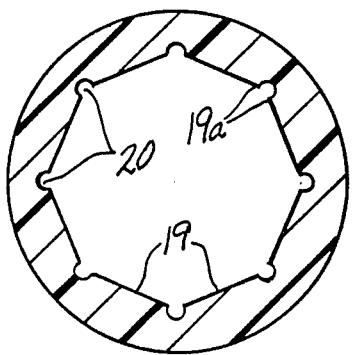

Referring now to the drawings in detail, a plastic parison or preform 10 is formed by injection molding from a synthetic resin which can be biaxially oriented, as for example poly (ethylene terephthalate). The preform 10 has a neck portion 11 defining an opening 12 and it may be provided with external threads 13 to serve as the site for attachment of a cap on the finished, blow molded plastic container. The preform 10 has a tubular body portion 14 depending from the neck portion 11 and an integral bottom structure 15 depending from the tubular body portion. The preform 10 has an outside wall face 16 and an inside wall face 17. The inside wall face 17 of the tubular body portion 14 is provided with a thickened portion 18 which extends onto bottom structure 15 and is characterized by a plurality of flat faces 19 with terminal portions thereof 19a.

Figure 2A:
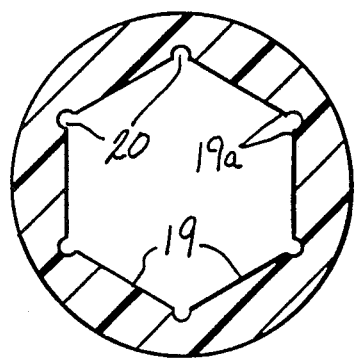
FIG. 2a is an enlarged sectional view along lines 2—2 of FIG. 1.
Figure 3:
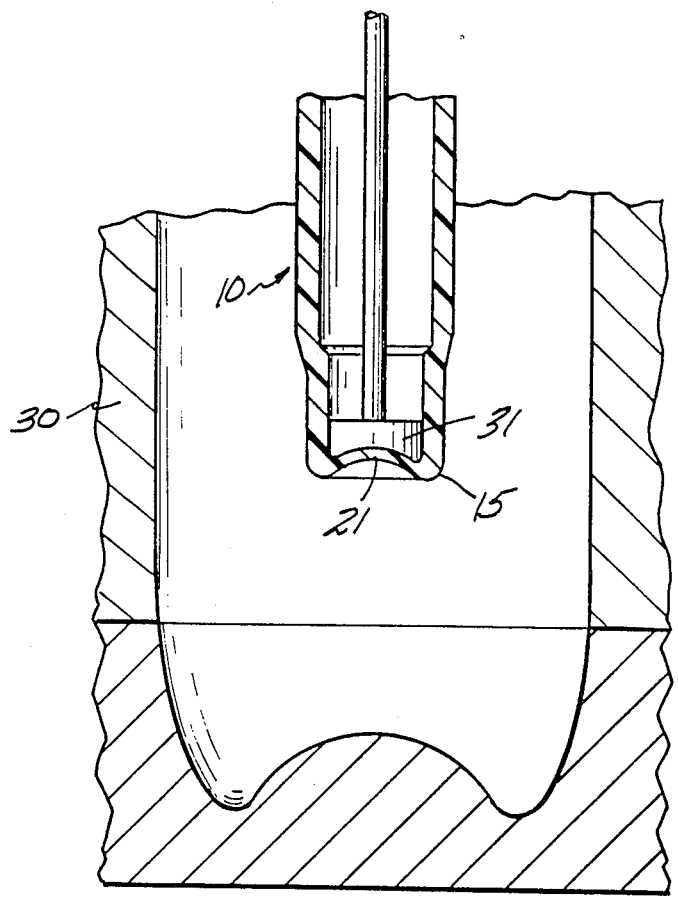
FIG. 3 is a partial sectional view taken through a mold for molding a container and having associated therewith a preform of the present invention similar to the preform of FIG. 1 which is to be stretched and blown therein to form a container of the present invention.

Scallop-shaped segments 20 connect the terminal portions of each flat face. Three or more of said flat faces may be used, although the hexagonal configuration of Figure 2a is preferred. Alternately, the octagonal configuration of FIG. 2b may readily be employed. The bottom structure 15 as shown in FIG. 1 may be flat or may be provided with an axially inwardly directed conical part 21 as shown in FIG. 3.

Figure 1:
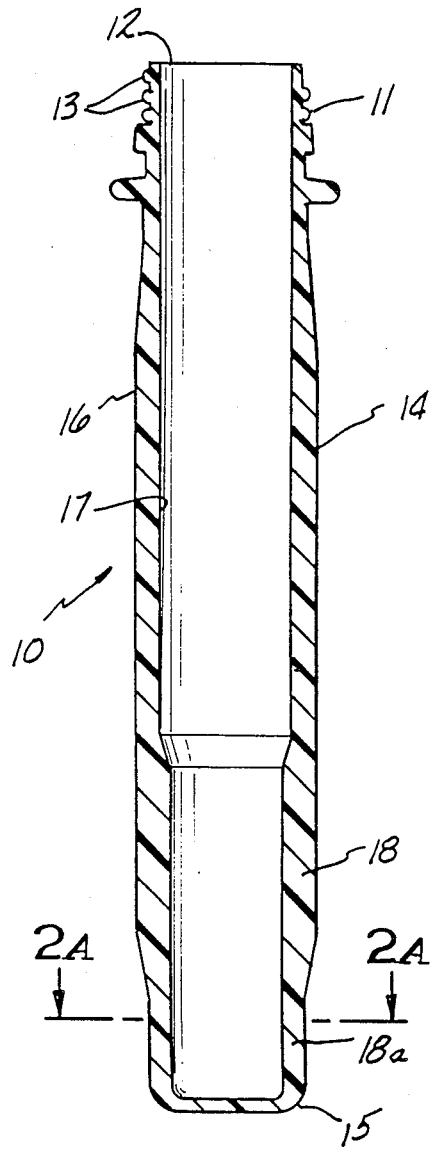
FIG. 1 is a sectional view of a preform of the present invention.

As shown in FIG. 1, thickened portion 18 includes a lower portion 18a adjacent the bottom structure having a wall thickness less than the wall thickness of the adjacent thickened portion 18. It has been found in accordance with the present invention that this may be employed in order to save material costs without loss of necessary properties in view of the significant advantages obtained in accordance with the present invention. Alternatively, if desired, external ribs may be provided on the preform as disclosed in copending U.S. Application Ser. No. 044,469.

Figure 4:
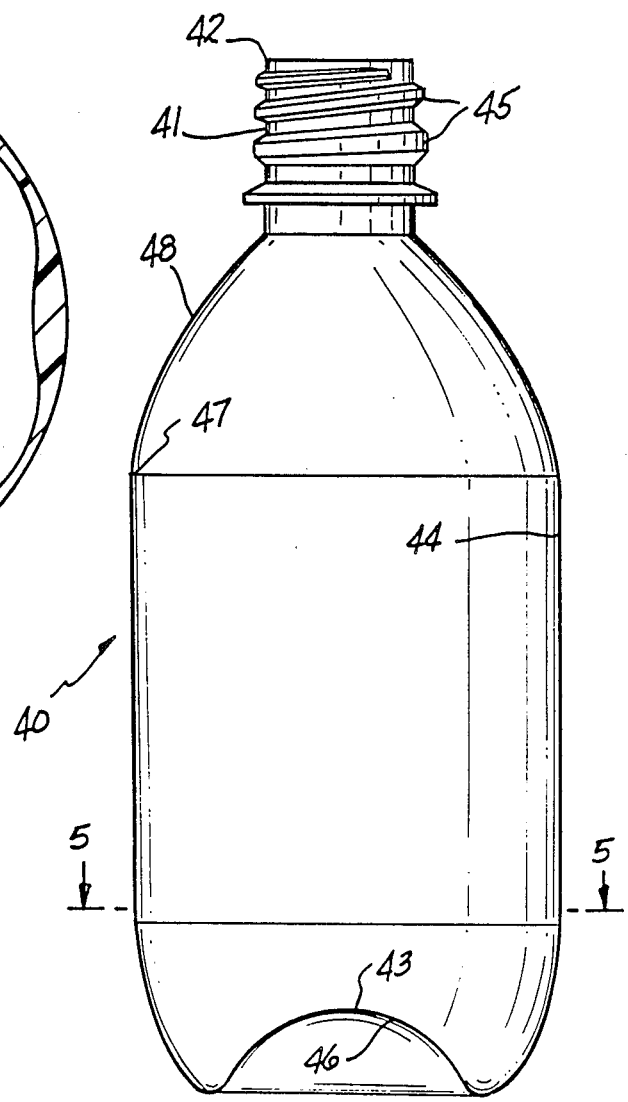
FIG. 4 is an elevational view of a container formed in FIG. 3.
Figure 6:
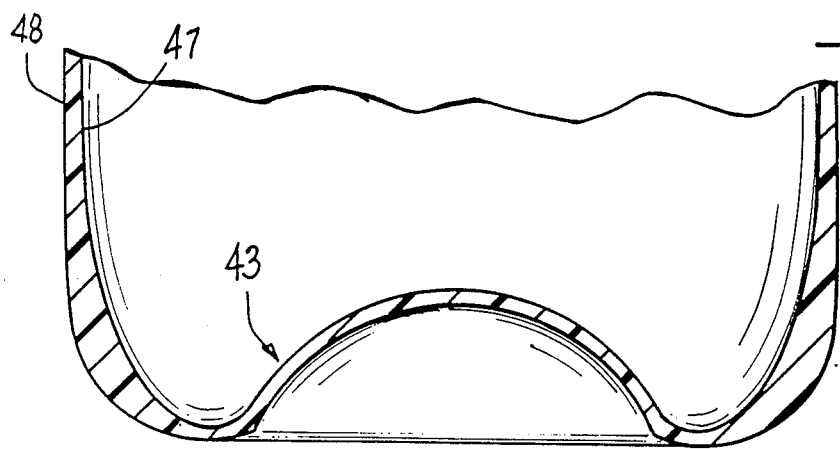
FIG. 6 is a partial, enlarged sectional view of the bottom portion and adjacent tubular body portion of the container of FIG. 4.

The thus formed preform is brought to a temperature at which blow molding can be accomplished which may be done by heating a previously formed parison or forming the hot parison in line with the blow molding operation and suitably adjusting the temperature thereof. The heated preform is then placed in a blow mold having the configuration of the desired container as blow mold 30 shown in FIG. 3 and while blowing compressed air thereinto, the interior side of bottom portion 15 is pushed down by movable means 31 to effect biaxial orientation. The particular blow mold 30 shown in FIG. 3 has an internal configuration which allows the formation of a plastic container 40 (see FIG. 4) having a desired configuration.

It is particularly preferred in accordance with the present invention to utilize a stretch rod wherein at least one cross-section of said rod is adapted to exact stretching of the bottom regions and stretches the bottom regions in an amount that is different then the amount of stretching of the tubular body portion to impart at least to the said bottom region continuous variations of thickness the thick parts thereof on average being thicker than the average body wall thickness of the container body portion. This method is fully disclosed in copending application Ser. No. 142,004, filed Jan. 11, 1988, the disclosure of which is hereby incorporated by reference.

Thus, blow molded plastic container 40 is formed having a neck portion 41 defining an opening 42, a bottom portion 43, a tubular body portion 44 interconnecting the neck portion 41 and the bottom portion 43. Neck portion 41 is provided with external threads 45 to serve as the site for attachment of a cap on the container, as with preform 10. The bottom portion 43 has an internal, axially inwardly directed generally conical part 46.

Figure 5:
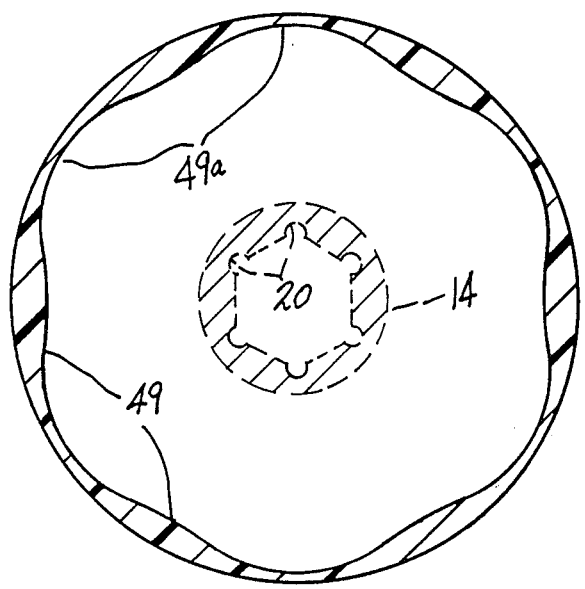
FIG. 5 is an enlarged sectional view taken along lines 5—5 of FIG. 4, with the corresponding sectional view of FIG. 2 superimposed therein in phantom.

FIG. 5 shows a preferred embodiment of the present invention wherein the flat faces form a hexagonal configuration. Scallop-shaped segments 20 form the thinner portions 49a of the regularly undulating cross-sectional configuration of the bottom portion of the container with 49 representing the thicker portions. Said segments may constitute parts of circles, to facilitate manufacture.

It can be readily seen from the foregoing that the scallop-shaped portions initiate deformation at the corner regions before deformation is initiated at the thickened portions. It can also readily be appreciated that the corresponding rate and degree of orientation at said scallop-shaped segments will be greater than at the flat faces. Also, deformation will tend to occur at a lower temperature at the scallop-shaped segments because the heat retention in the thicker section is smaller to begin with and the drop in temperature during deformation accelerates in keeping with the corresponding degree of thinning of the cross section. Moreover, it can be readily appreciated that thinner portions 49a are elongated or extended due to the presence of scallop-shaped segments 20 with a consequent increased strength therein over that which would be provided without the scallop-shaped segments.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A plastic preform for forming blow molded plastic bottles which comprises: a neck portion defining an opening; a tubular body portion depending therefrom; and an integral bottom structure depending from the tubular body portion wherein said tubular body portion includes a lower portion with a thickened portion in said lower portion; said preform having an outside wall face and an inside wall face with the inside wall face of the tubular body portion adjacent the bottom structure and extending onto said bottom structure having a plurality of flat faces with terminal portions thereof; and scallop-shaped segments connecting the terminal portions of each flat face adapted to deform upon exposure to stresses prior to deformation of the flat faces and thereby become subject to an increased rate and degree of orientation.

2. A preform according to claim 1 wherein said flat faces forma hexogonal configuration.

3. A preform according to claim 1 wherein said flat faces form a octagonal configuration.

4. A preform according to claim 1 wherein the wall thickness of the tubular body portion adjacent the bottom structure is less than the wall thickness of the adjacent thickened tubular body portion.

5. A preform according to claim 1 which is injection molded.

6. A preform according to claim 1 including an axially inwardly directed conical part on said bottom structure.

7. A preform according to claim 1, wherein each of said segments constitutes a segment of a circle.

8. A blow molded plastic container prepared from the preform of claim 1 by stretch blow molding.

* * * * *